United States Patent
Tijerina et al.

(10) Patent No.: US 10,246,086 B2
(45) Date of Patent: Apr. 2, 2019

(54) ECHELON PARKING

(71) Applicant: Ford Global Technologies, LLC, Dearborn, MI (US)

(72) Inventors: Louis Tijerina, Dearborn, MI (US); John Shutko, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 154 days.

(21) Appl. No.: 15/259,271

(22) Filed: Sep. 8, 2016

(65) Prior Publication Data

US 2018/0065625 A1 Mar. 8, 2018

(51) Int. Cl.
| | |
|---|---|
| *B60W 10/20* | (2006.01) |
| *B60W 30/06* | (2006.01) |
| *B60W 50/08* | (2012.01) |
| *G05D 1/00* | (2006.01) |
| *G05D 1/02* | (2006.01) |

(52) U.S. Cl.
CPC .......... *B60W 30/06* (2013.01); *B60W 10/20* (2013.01); *B60W 50/082* (2013.01); *G05D 1/0055* (2013.01); *G05D 1/0088* (2013.01); *G05D 1/0214* (2013.01); *B60W 2720/24* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,777,619 B2 | 8/2010 | Yopp et al. | |
| 8,618,922 B2 | 12/2013 | Debouk et al. | |
| 2011/0241862 A1 | 10/2011 | Debouk et al. | |
| 2015/0153733 A1 | 6/2015 | Ohmura et al. | |
| 2016/0121906 A1* | 5/2016 | Matsuno | B60K 28/10 701/23 |
| 2016/0214612 A1* | 7/2016 | Kashiba | B60W 10/04 |
| 2017/0287338 A1* | 10/2017 | Neubecker | B60R 1/00 |
| 2018/0052463 A1* | 2/2018 | Mays | B60T 7/18 |

FOREIGN PATENT DOCUMENTS

| | | |
|---|---|---|
| DE | 102009016936 A1 | 11/2009 |
| DE | 102011109618 A1 | 2/2013 |
| DE | 102012024370 A1 | 7/2013 |
| DE | 102014007171 A1 | 11/2014 |

(Continued)

OTHER PUBLICATIONS

Knipling et al., "Rear-End Crashes: Problem Size Assessment and Statistical Description" Office of Crash Avoidance Research, DOT HS 807 994, May 1993 (53 pages).

(Continued)

*Primary Examiner* — Jonathan M Dager
*Assistant Examiner* — Garrett F Evans
(74) *Attorney, Agent, or Firm* — Frank A. MacKenzie; Bejin Bieneman PLC

(57) ABSTRACT

Upon determining that one of a driver condition and a subsystem fault preventing continued operation has occurred, certain actions are taken by an autonomously operating vehicle. An appropriate road-side location for parking is identified. The vehicle is maneuvered to the appropriate road side location. The vehicle is oriented to a specified acute angle to an adjacent traffic lane.

19 Claims, 6 Drawing Sheets

(56) References Cited

FOREIGN PATENT DOCUMENTS

GB        2496905 A    5/2013
GB        2524393 A    9/2015

OTHER PUBLICATIONS

Langham, "An investigation of the role of vehicle conspicuity in the 'Looked but failed to see' error in driving", Unpublished Ph.D dissertation, University of Sussex School of Cognitive and Computing Sciences, 1999 (200 pages).

Langham et al., "An analysis of 'looked but failed to see' accidents involving parked police vehicles", Ergonomics, vol. 45, 2002—Issue 3, Nov. 9, 2010 (7 pages).

Tijerina, "Committee Report: Conspicuity Enhancement for Police Interceptor Rear-end Crash Mitigation", The blue Ribbon Panel Committee on Lighting and Conspicuity, Feb. 13, 2003 (46 pages).

UKIPO Search Report for Application No. GB1713906.4 dated Feb. 19, 2018 (5 pages).

* cited by examiner

ECHELON PARKING

BACKGROUND

Autonomous vehicles may experience subsystem faults and failures of human drivers to respond to take over requests. With such occurrences, it is typically desirable that the autonomous vehicle take action to minimize a risk of other vehicles colliding with the autonomous vehicle.

DETAILED DESCRIPTION

Introduction

Upon determining that one of a driver condition and a subsystem fault preventing continued operation on a roadway has occurred, certain actions are taken by an autonomously operating vehicle. An appropriate road-side location for parking is identified. The vehicle is maneuvered to the appropriate road-side location. The vehicle is oriented to a specified acute angle to an adjacent traffic lane.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such example orientations are from the perspective of an occupant seated in a driver seat, facing a dashboard. In the Figures, like numerals indicate like parts throughout the several views.

Exemplary System Elements

Figure 1:
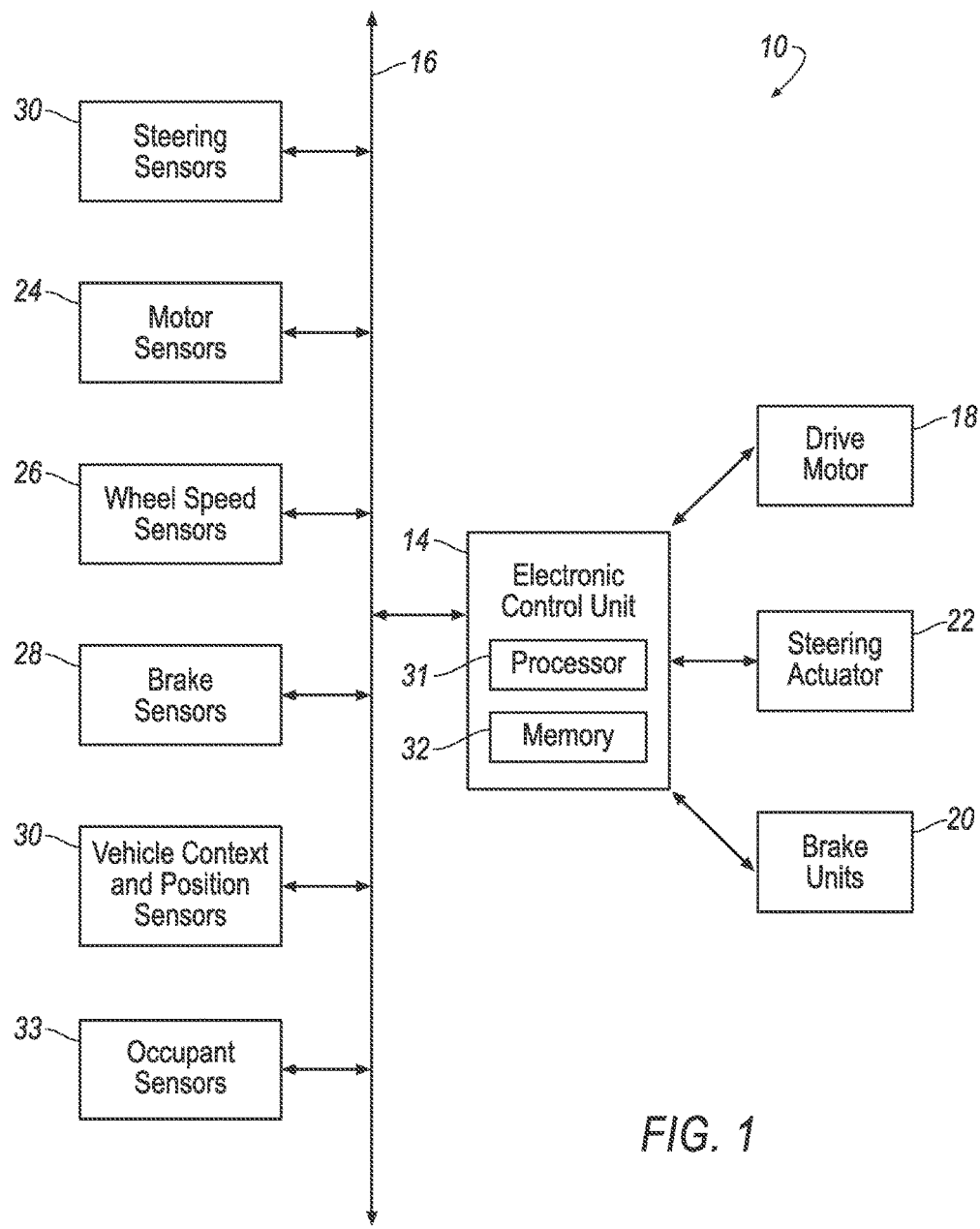
FIG. 1 schematically illustrates an example system.
Figure 2:
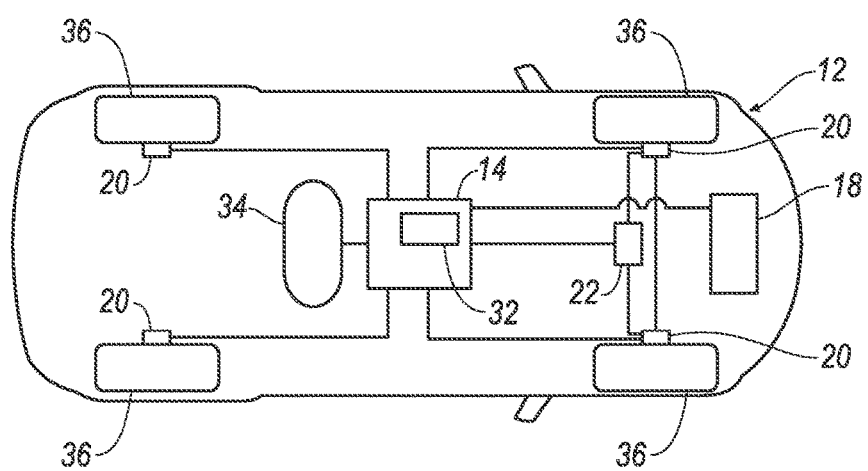
FIG. 2 schematically illustrates an example vehicle incorporating the system of FIG. 1.

FIG. 1 schematically illustrates an example system 10 for autonomously maneuvering an autonomous vehicle 12. Vehicle 12 is schematically illustrated in FIG. 2. System 10 may include a plurality of sensors and a plurality of actuators, connected directly or indirectly to an example computing device in the form of an electronic control unit or ECU 14. System 10 may include an example system controller area network ("CAN") bus 16 which provides a transmission media between and connecting elements of system 10 including ECU 14 and components and subsystems including, by way of example, a drive motor 18, a plurality of brake units 20, a steering actuator 22, motor sensors 24, wheel speed sensors 26, brake sensors 28, and steering sensors 30. While each of drive motor 18, brake units 20 and steering actuator 22 are illustrated as being connected directly to ECU 14, they may alternatively be connected to ECU 14 through bus 16. Each of drive motor 18, brake units 20 and steering actuator 22 may include a respective electronic controller that receives instructions from ECU 14.

ECU 14 includes an electronic processor 31 and an associated memory 32. The memory 32 of ECU 14 includes one or more forms of computer-readable media, and stores instructions executable by the processor 31 for performing various operations, including such operations as disclosed herein. ECU 14 includes programming to autonomously operate autonomous vehicle 12 in both a fully autonomous mode and a part-time autonomous mode as is known. For purposes of this disclosure, a fully autonomous mode is defined as one in which each of vehicle 12 propulsion via a powertrain including a motor 18 as defined below, braking, and steering are controlled by the ECU 14 under substantially all circumstances. A part-time autonomous mode is defined as one in which each of vehicle 12 propulsion, braking, and steering are controlled by ECU 14, with such autonomous mode control being interrupted by ECU 14 to seek human intervention in some circumstances. Such an interruption may include a manual turn-over-request ("TOR") sequence, discussed further below.

The memory of ECU 14 also stores data. Data may include collected data that is collected from a variety of devices. In general, collected data may include any data from an appropriate map database, and any data that may be gathered by any data collection device including motor sensors 24, wheel speed sensors 26, steering sensors 30, occupant sensors 33, environment sensors 34, and data collected during previous drives by any of the sensors, and/or yet further including data computed from such data. Exemplary steering sensors may include a rack position sensor and/or a lateral acceleration sensor. Exemplary environment sensors 34 may include vehicle context and position sensors such as a radar sensor, a lidar sensor, a vision sensor and the like. The foregoing examples are not intended to be limiting. Other types of data collection devices may be used to provide data to ECU 14. Data may also include calculated data calculated in ECU 14 from collected data and from other calculated data.

Vehicle 12 is schematically illustrated in FIG. 2. Vehicle 12 includes four wheels 36, each of which may include a tire (not shown). Each of wheels 36 may be associated with one of brake units 20. Wheel speed sensors 26 may be integrated into brake units 20. Steering actuator 22 and associated steering sensors are incorporated into vehicle 12's steering system. Motor 18 may, by way of example, be an internal combustion engine or an electric motor or a combination thereof. Although motor 18 is illustrated as a single unit near a front of vehicle 12, motor 18 may alternatively be located elsewhere in the vehicle 12. Motor 18 may yet alternatively be provided in the form of a plurality of electric motors associated with a plurality of wheels 36. An all-wheel drive vehicle may have a motor 18 associated with each wheel 36.

The memory of ECU 14 stores data received via various communications mechanisms. ECU 14 may be configured for communications on a vehicle network such as an Ethernet network or the CAN bus 16 or the like, and/or for using other wired or wireless protocols, e.g., Bluetooth®, Bluetooth® Low Energy, or WiFi. ECU 14 may also have a connection to an onboard diagnostics connector such as an OBD-II connector. Via the CAN bus, OBD-II, Ethernet, and/or other wired or wireless mechanisms, ECU 14 may transmit messages to various devices in a vehicle and/or receive messages from the various devices, e.g., controllers, actuators, sensors, switches, etc. as discussed herein. Although ECU 14 is shown as a single ECU in FIG. 3 for ease of illustration, it is to be understood that ECU 14 could in fact include and various operations described herein could be carried out by one or more computing devices, e.g., vehicle component controllers such as are known and/or a computing device dedicated to the discrete brake units 20, steering control unit 22 and motor 18.

Figure 3:
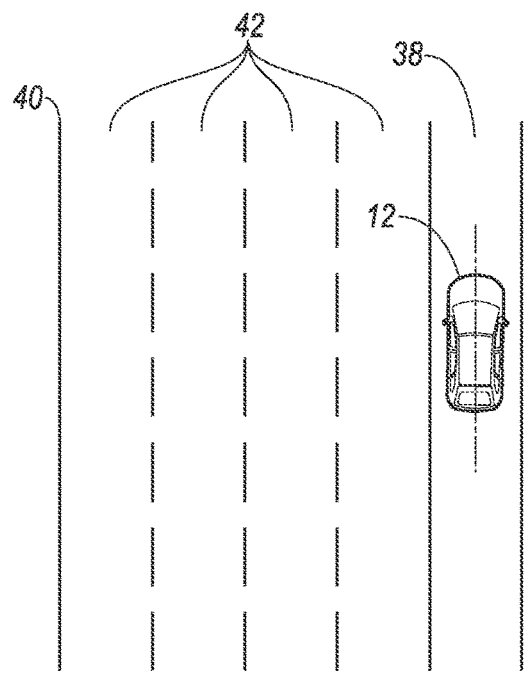
FIG. 3 illustrates the vehicle of FIG. 2 parked in an example first position.
Figure 4:
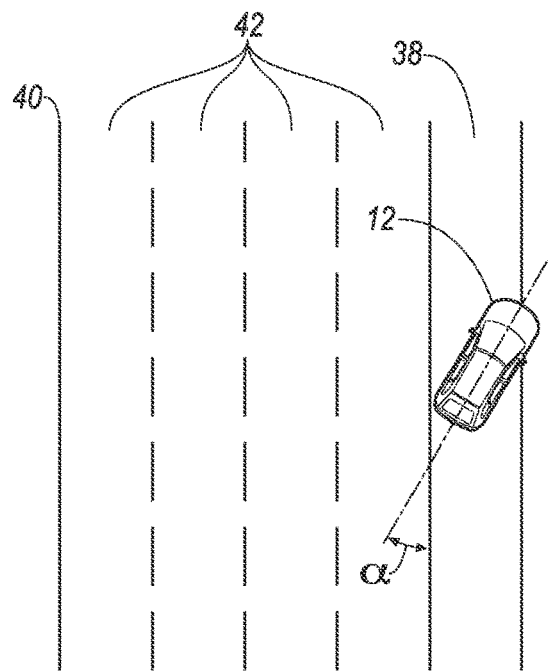
FIG. 4 illustrates the vehicle of FIG. 2 parked in an example second position.
Figure 5:
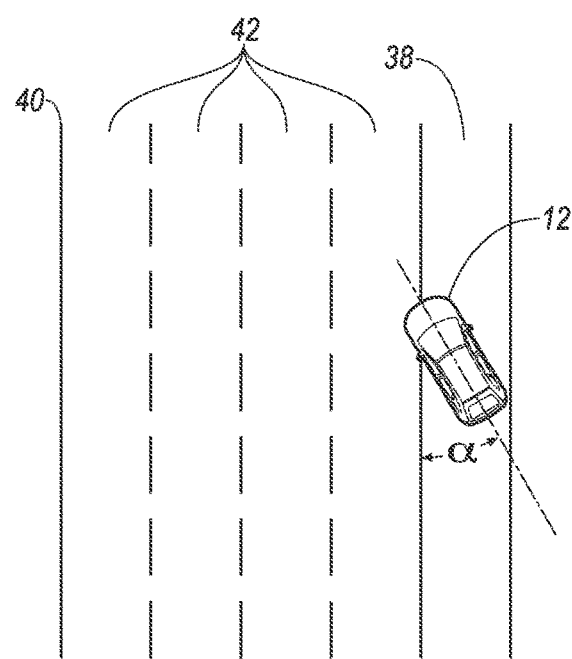
FIG. 5 illustrates the vehicle of FIG. 2 parked in an example third position.

FIG. 3 illustrates vehicle 12 parked on a right-hand shoulder 38, substantially parallel to traffic lanes 42. A plurality of three example traffic lanes 42 separate shoulder 38 from a center median 40. FIG. 4 and FIG. 5 each illustrate vehicle 12 parked on right-hand shoulder 38, at two distinct values of an angle $\alpha$ to the traffic lanes 42. In FIG. 4, an example illustrated value of $\alpha$ is from 30° to 45° to the traffic lanes 42. In FIG. 5, an example illustrated value of $\alpha$ is from negative 30° to negative 45° to the traffic lanes 42. How vehicle 12 is directed to the positions of FIG. 4 and FIG. 5 is explained in more detail below. Unless expressly states as a positive or a negative angle, references to a particular angle include both positive and negative angle orientations. For example, a reference to 45° refers to both positive 45° and negative 45°.

Processing

Figure 6:
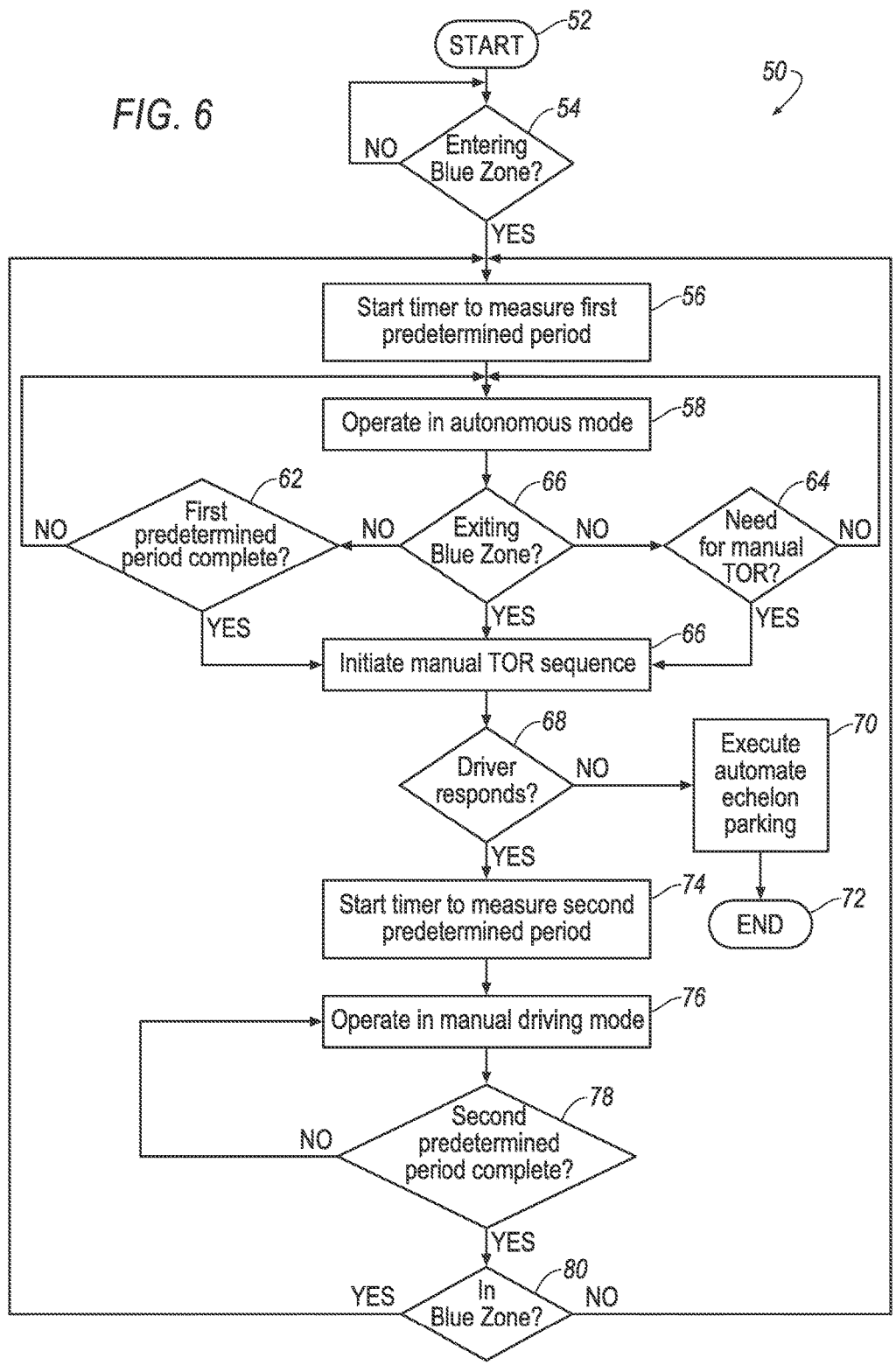
FIG. 6 illustrates a first flow chart of example logic for safe autonomous parking by a Level 2 or above autonomous vehicle.

FIG. 6 illustrates a parking process for an example autonomous vehicle that, as set forth above, may interrupt operation in the part-time autonomous mode to seek human intervention in some circumstances. ECU 14 executes the steps illustrated in FIG. 6 as described below. A computer program for executing a process 50 is initiated in start block 52. The computer program may be initialized at start block 52, e.g., when vehicle 12 begins driving on a roadway. Initialization includes conventional low-level software steps, well-known in the software art and not critical to the present description.

Next, decision block 54 determines as to whether vehicle 12 has entered a predetermined geographic area, e.g., a section of road suited for operation in the part-time autonomous mode. Such a section of road is identified herein as a blue zone. An example blue zone may be a portion of a limited access highway suited for a continuous autonomous operation of vehicle 12. Example features of blue zones may include sections of limited access highways having a constant number of traffic lanes, a low vehicle density, no natural hazards such as rock slide zones, and no more than a predetermined number of traffic interchanges per unit of distance. Vehicle 12 may determine whether it is in, or entering, or leaving a blue zone based on any data including, by way of example, data from environment sensors 34, map data that may be stored in the memory of ECU 14, and Global Position System data.

When decision block 54 determines that vehicle 12 is not entering a blue zone, process 50 loops back to decision block 54 and checks again to determine if vehicle 12 is in a blue zone. When it is determined that vehicle 12 is in a blue zone, process 50 moves to process block 56 which starts a first timer that measures a predetermined period of time of operation in an autonomous mode of operation. One example predetermined period of time is six minutes. Process 50 then moves to process block 58 which operates vehicle 12 in the part-time autonomous mode. Process blocks 56 and 58 may alternatively be initiated in parallel.

Process block 50 moves from process block 58 to decision block 60. Decision block 60 determines whether vehicle 12 is exiting the blue zone. When decision block 60 determines that vehicle 12 is not exiting the blue zone, process 50 undertakes two additional inquiries in subsequent decision blocks 62 and 64 that may be processed in parallel or serially.

Decision block 62 determines whether the first time period has elapsed. If the first time period has not yet elapsed, process 50 cycles back to process block 58 to continue operation in the part-time autonomous mode. If the first time period has elapsed, process 50 moves to process block 66 in anticipation of a scheduled return of control of vehicle 12 to a human driver.

Decision block 64 determines whether there is a need for human intervention, or an initiation of a manual TOR sequence. Any subsystem fault, including a compromised steering system, a compromised drive motor, a compromised brake system, and a compromised tire may alternatively be a basis for triggering a manual TOR sequence, may require a shutdown of vehicle 12 and may prevent continued operation on a roadway and may require prompt roadside parking. An example compromised steering system may include a reduction of power from a steering actuator resulting in diminished steering capacity and a non-functioning steering sensor. An example compromised brake system may include a brake unit 20 not fully applying a commanded brake force and a brake unit 20 not fully releasing an associated wheel 36 when so commanded. An example compromised drive motor may include a decrease in available power. An example compromised tire may include a low pressure tire. Example compromised environment sensors 34 may include sensors 34 being covered by any light obscuring substance, such as excessive snow. When decision block 64 determines there is not a need for a manual TOR sequence, process 50 cycles back to process block 58 to continue operation in the part-time autonomous mode. If decision block 64 determines there is a need for a manual TOR sequence, process 50 moves to process block 66 for an unscheduled return of control of vehicle 12 to the human driver.

Process block 60 initiates the manual TOR sequence to transfer control of vehicle 12 from ECU 14 to the human driver for operation in a manual driving mode of operation. The manual TOR sequence includes prompting the human driver to take action to retake control of vehicle 12. Decision block 68 follows process block 66. Decision block 68 determines whether the human driver has responded to the manual TOR sequence. The human driver may not respond for several reasons, including but not limited to distraction, fatigue, sleep, medical emergency, and intoxication. A lack of response from a human driver and the determination of a lack of a response may require vehicle shutdown and may prevent continued operation on a roadway and may further require prompt roadside parking. When decision block 68 determines that the human driver has not responded, process 50 moves to process block 70 and ECU 14 automatically initiates an echelon parking maneuver and brings vehicle 12 to a safe stand-still or parked condition in an appropriate roadside location at an angle $\alpha$ to the adjacent traffic lanes. Vehicle 12 has a velocity of zero in the parked condition.

An appropriate roadside location for vehicle 12 parking may be determined by ECU 14 based on factors including an available shoulder width, the presence of any obstacles that might reduce an available shoulder width including by way of example, guardrails and bridge abutments, the location of other vehicles on the shoulder, the proximity of the location to traffic intersections including off-ramps and on-ramps, the distance of vehicle 12 from a preferred parking location, and an estimated time before vehicle 12 becomes immobile if, for example, vehicle 12 suffers a loss of drive power.

As noted above, and illustrated in the FIGS. 3-5, echelon parking at angle $\alpha$ may be in a range of either plus or minus 30° to 45° to the adjacent traffic lanes. Angles within the positive and negative ranges, 30° to 45° and −30° to −45°, are all perceptible acute angles to the adjacent traffic lanes. Perceptible acute angles of echelon parking are of a large enough magnitude to be readily detected by approaching drivers and by approaching autonomous vehicles. Determination of a threshold minimum perceptible angle may be empirically determined for various types of roadways, e.g., straights, curved, narrow shoulder, broad shoulder, wide, narrow, etc. As a general rule, an angle of 30° or greater may be considered perceptible. Such angles for echelon parking have been established as providing an increase in conspicuity of a vehicle so parked when compared with a vehicle parked parallel to the adjacent traffic lanes. The computer program uses information available on the available lane width and, if available, shoulder width, as well as any operational constraints, to specify an appropriate angle for the space and constraint circumstances at hand. Operational constraints on the specified angle may include a compromised steering system, a compromised drive motor, a compromised brake system, and a compromised tire and may also include impeding traffic.

An exemplary parking maneuver is described for vehicle 12 operating in the part-time autonomous mode. When ECU 14 has determined a need to stop, ECU 14, controlling brake units 20 and drive motor 18, decreases the speed of vehicle 12 to a speed suited for parking maneuvers. By way of example, when vehicle 12 is in a left traffic lane 42, adjacent to a left shoulder, ECU 14 directs steering actuator 22 to steer vehicle 12 away from the shoulder and toward the adjacent traffic lane to maximize maneuvering space. ECU 14 then directs steering actuator 22 to swing vehicle 12 toward the shoulder 38. Actuator 22, in combination with brake units 20 and motor 18, are manipulated by ECU 14 to position vehicle 12 on the left shoulder at a 45° angle to traffic lanes 42. Using data available to it, ECU may modulate the angle to something less than 45° when ECU determines that a front portion of vehicle 12 will reach a limit of available space, e.g. an edge of shoulder 38, a barrier, or other shoulder obstacle before a rear portion of vehicle is safely out of adjacent lane 42 most immediately adjacent to the left shoulder. As an alternate example, when vehicle 12 is in a traffic lane 42 adjacent to right shoulder 38, ECU may direct steering actuator 22 to initially bias vehicle 12 toward a left line of lane 42, and then to swing vehicle 12 toward the right shoulder 38. Actuator 22, in combination with brake units 20 and motor 18, are manipulated to position vehicle 12 on shoulder 38 at a 45° angle to traffic lanes 42. Using data available to it, ECU may modulate the angle to something less than 45° when ECU determines that a front portion of vehicle 12 will reach a limit of available space, e.g. an edge of shoulder 38, a barrier, or other shoulder obstacle before a rear portion of vehicle is safely out of adjacent lane 42.

Echelon parking may be combined with other actions to increase a conspicuity of vehicle 12 to approaching drivers and vehicles to decrease a risk of being struck by another vehicle. Such other actions include and are not limited to activation of vehicle emergency flashers, initiating vehicle-to-vehicle ("V2V") notification, and initiating other forms of communication to indicate autonomous vehicle 12's location and standstill state. The vehicle's electronic parking brake may be set to prevent vehicle movement as part of the standstill state. Auditory conspicuity devices (e.g., car alarm) may also be employed. After vehicle 12 is parked, process 50 is terminated at end block 72.

When decision block 68 determines that the human driver has responded appropriately, process 50 moves to process block 74 which starts a second timer that measures a second predetermined period of time of operation in the manual driving mode. One example second predetermined period of time is one minute. Process 50 then moves to process block 76 which transitions the operation of vehicle 12 to the human driver. Process blocks 74 and 76 may alternatively be initiated in parallel. Once vehicle 12 is operating under human control, process 50 moves to decision block 78.

Decision block 78 determines whether the second predetermined period has been completed. When the second predetermined period has not been completed, process 50 loops back to process block 76 to continue operation of vehicle 12 in the manual driving mode under human control. When the second predetermined period has be completed, process block 50 moves to decision block 80.

Decision block 80 determines whether vehicle 12 is operating in a blue zone. If yes, then process 50 loops back to process block 58 to return vehicle 12 to the part-time autonomous mode of operation. If it is determined that the vehicle is not operating in a blue zone, the vehicle remains under human control, and process 50 loops back to decision block 54 to determine if vehicle 12 is entering a blue zone.

Figure 7:
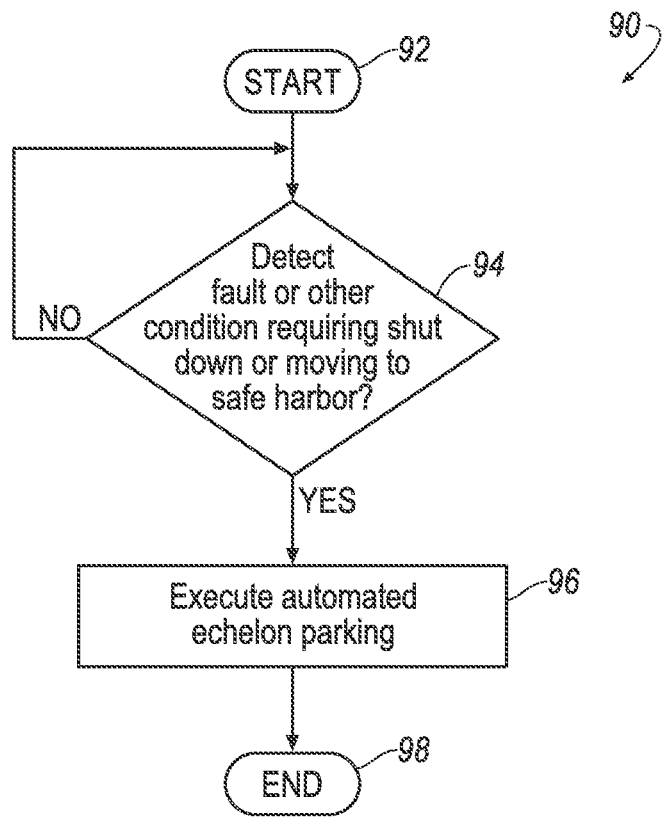
FIG. 7 illustrates a second flow chart of example logic for safe autonomous parking by a Level 4 or above autonomous vehicle.

FIG. 7 illustrates a parking process 90 for a fully autonomous mode, that as set forth above, operates without human intervention. As noted above, vehicle 12 in the fully autonomous mode may operate the vehicle steering, acceleration, and braking, as well as monitor of the driving environment without relying on the driver to intervene. ECU 14 with software for the fully autonomous mode executes the steps illustrated in FIG. 7 as described below.

A computer program for executing process 90 is initiated in start block 92. The computer program may be initialized at start block 92, e.g., when vehicle 12 begins driving on a roadway. Initialization includes conventional low-level software steps, well-known in the software art and not critical to the present description.

Process 90 then moves to decision block 94. Decision block 94 checks to see if there is a subsystem fault requiring a shutdown of vehicle 12 or any other reason for needing a move to safe harbor. Subsystem faults requiring a shutdown of vehicle 12 may include compromised steering, drive motor, brake systems and tires and may also include vehicle impacts and can be reported in known ways, e.g., messages on CAN bus 16. If no, then process 90 loops back to decision block 94 to continue checking. If yes, then process 90 moves to process block 96. The determination of such a subsystem fault may require a shutdown of vehicle 12 and may also require prompt roadside parking.

Process block 94 has ECU 14 automatically initiate an echelon parking maneuver, parking vehicle 12 at an angle $\alpha$ to the adjacent traffic lanes in an appropriate roadside location. As noted above in the discussion of echelon parking in a part-time autonomous mode, and illustrated in the FIGS. 3-5, $\alpha$ may be in a range of either plus or minus 30° to 45° to the adjacent traffic lanes. Also as with a part-time autonomous mode, ECU 14 uses information available on the available lane width and, if available, shoulder width, as well as any operational constraints, to specify an appropriate angle for the space and circumstances at hand.

An exemplary parking maneuver is described for vehicle 12 operating in the fully autonomous mode. When ECU 14 has determined a need to stop, ECU 14 first identifies a location of a safe harbor parking location. Shoulder 38 on a limited-access highway is an exemplary safe harbor. Having identified a safe harbor, ECU 14 biases vehicle 12 toward that location, entering the traffic lane adjacent, in the present example, shoulder 38. In approaching the safe harbor location, ECU 14, controlling brake units 20 and drive motor 18, decreases the speed of vehicle 12 to a speed suited for parking maneuvers. With vehicle 12 is in the traffic lane 42 adjacent shoulder 38, ECU may direct steering actuator 22 to initially bias vehicle 12 toward a left line of lane 42 to maximize maneuvering space, and then to swing vehicle 12 toward the shoulder 38. Actuator 22, in combination with brake units 20 and motor 18, are manipulated to position vehicle 12 on shoulder 38 at a 45° angle to traffic lanes 42. Using data available to it, ECU may modulate the angle to something less than 45° when ECU determines that a front portion of vehicle 12 will reach a limit of available space, e.g. an edge of shoulder 38, a barrier, or other shoulder obstacle before a rear portion of vehicle is safely out of adjacent lane 42. If a safe harbor is identified on a left shoulder, ECU 14 would direct similar maneuvering toward the left shoulder.

Echelon parking in the fully autonomous mode, as with echelon parking in the part-time autonomous mode, may be combined with other actions to increase the conspicuity of vehicle 12 to decrease a risk of being struck by another vehicle including activation of vehicle flashers, initiating vehicle-to-vehicle ("V2V") notification, and initiating other forms of communication to indicate the autonomous vehicle's location and standstill state. The vehicle's electronic parking brake may be set to prevent vehicle movement as part of the standstill state. After parking vehicle 12, process 90 is terminated at end block 98.

CONCLUSION

An example system and method for autonomously maneuvering a vehicle to an appropriate road-side location for parking and orienting the vehicle to a perceptible acute angle to an adjacent traffic lane have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising a computing device that includes a processor and a memory, the memory storing instructions executable by the processor to:
   determine when one of a driver condition and a subsystem fault preventing continued operation on a roadway occurs;
   identify an orientation for parking the vehicle at a specified acute angle relative to an adjacent traffic lane; and
   initiate operation in an autonomous mode only in a predetermined geographic area and maneuver the vehicle to park at the orientation.

2. A system as claimed in claim 1, wherein an initial specified acute angle is 45°.

3. A system as claimed in claim 2, wherein the angle is reduced to accommodate a shoulder obstacle.

4. A system as claimed in claim 1, wherein the driver condition is a lack of response from a driver responsive to a request initiated by the computing device.

5. A system as claimed in claim 1, wherein the instructions further comprise instructions to prompt a driver to operate the vehicle in a manual driving mode upon exiting the predetermined geographic area.

6. A system as claimed in claim 5, wherein the instructions further comprise instructions to return operation to the autonomous mode after a second period of time of operation in the manual driving mode.

7. A system as claimed in claim 1, wherein the instructions further comprise instructions to prompt a driver to operate the vehicle in a manual driving mode after a first predetermined period of time of operation in an autonomous mode.

8. A system as claimed in claim 7, wherein the instructions further comprise an instruction to return operation to the autonomous mode after a second period of time of operation in the manual driving mode.

9. A system as claimed in claim 1, wherein the subsystem fault may include any one of a compromised steering system, a compromised drive motor, a compromised brake system, and a compromised tire and a vehicle impact.

10. A method of controlling a vehicle, comprising:
    determining when one of a driver condition and a subsystem fault preventing continued operation on a roadway occurs;
    identifying an orientation for parking the vehicle at a specified acute angle relative to an adjacent traffic lane; and
    initiating operation in an autonomous mode only in a predetermined geographic area and maneuvering the vehicle to park at the orientation.

11. A method as claimed in claim 10, wherein an initial specified acute angle is 45°.

12. A system as claimed in claim 11, wherein the angle is reduced to accommodate a shoulder obstacle.

13. A method as claimed in claim 10, wherein the driver condition is a lack of response from a driver responsive to a request initiated by the computing device.

14. A method as claimed in claim 10, wherein the method further comprises a step of prompting a driver to operate the vehicle in a manual driving mode upon exiting the predetermined geographic area.

15. A method as claimed in claim 14, wherein the method further comprises a step of returning operation to the autonomous mode after a second period of time of operation in the manual driving mode.

16. A method as claimed in claim 10, wherein the method further comprises a step of prompting a driver to operate the vehicle in a manual driving mode after a first predetermined period of time of operation in an autonomous mode.

17. A method as claimed in claim 16, wherein the method further comprises a step of returning operation to the autonomous mode after a second period of time of operation in the manual driving mode.

18. A method as claimed in claim 10, wherein the subsystem fault may include any one of a compromised steering system, a compromised drive motor, a compromised brake system, and a compromised tire and a vehicle impact.

19. A system, comprising a computing device that includes a processor and a memory, the memory storing instructions executable by the processor to:
    determine when one of a driver condition and a subsystem fault preventing continued operation on a roadway occurs;

identify an orientation for parking the vehicle at a specified acute angle relative to an adjacent traffic lane;
maneuver the vehicle to park at the orientation; and
prompt a driver to operate the vehicle in a manual driving mode after a first predetermined period of time of operation in an autonomous mode.

\* \* \* \* \*